(12) United States Patent
Davis

(10) Patent No.: US 8,776,089 B2
(45) Date of Patent: *Jul. 8, 2014

(54) FILE SYSTEM INDEPENDENT CONTENT AWARE CACHE

(71) Applicant: VMware, Inc., Palo Alto, CA (US)

(72) Inventor: Scott Howard Davis, Needham, CA (US)

(73) Assignee: VMware, Inc., Palo Alto, CA (US)

( * ) Notice: Subject to any disclaimer, the term of this patent is extended or adjusted under 35 U.S.C. 154(b) by 43 days.

This patent is subject to a terminal disclaimer.

(21) Appl. No.: 13/675,560

(22) Filed: Nov. 13, 2012

(65) Prior Publication Data

US 2013/0167155 A1    Jun. 27, 2013

Related U.S. Application Data

(63) Continuation of application No. 12/767,581, filed on Apr. 26, 2010, now Pat. No. 8,312,471.

(51) Int. Cl.
*G06F 3/00* (2006.01)
*G06F 9/455* (2006.01)

(52) U.S. Cl.
USPC .............................. 719/321; 718/1

(58) Field of Classification Search
None
See application file for complete search history.

(56) References Cited

U.S. PATENT DOCUMENTS 7,111,303 B2 *   9/2006  Macchiano et al. .......... 719/313
8,255,922 B1 *   8/2012  Fresko et al. ................. 719/312

OTHER PUBLICATIONS

Tobias, Murer, Replacing Copies with Connections: Managing sofware across the virtual Organization, 1990.*
Noll et al., "CellVM: A Homogeneous Virtual Machine Runtime System for a Heterogeneous Single-Chip Multiprocessor," Dec. 23, 2006, pp. 1-11.

* cited by examiner

*Primary Examiner* — Lechi Truong

(57) ABSTRACT

A server supporting the implementation of virtual machines includes a local memory used for caching. During I/O intensive processes, a "content aware" cache filter component of the server first accesses a cache structure in a content cache device to determine whether data blocks have been stored in the cache structure prior to requesting the data blocks from a networked disk array via a standard I/O stack of the hypervisor.

20 Claims, 5 Drawing Sheets

FILE SYSTEM INDEPENDENT CONTENT AWARE CACHE

CROSS REFERENCE TO RELATED APPLICATIONS

This application is a continuation of U.S. patent application Ser. No. 12/767,581 filed Apr. 26, 2010, issued as U.S. Pat. No. 8,312,471 and entitled "File System Independent Content Aware Cache," which is incorporated by reference herein.

BACKGROUND

Organizations are increasingly adopting virtual desktop infrastructure (VDI) solutions to simplify desktop administration tasks and increase security and data safeguard measures. With VDI, desktop operating systems and applications are run inside virtual machines (also referred to herein as "virtual desktops") that reside on servers in an organization's data center. Users access the virtual desktops through a thin client application that runs on their desktop PC (or any other similar computer terminal, including, for example, zero-touch clients, thin clients, laptops, tablets, smartphones and the like) and utilizes a remote display protocol to render the graphical user interface of the desktop operating system on the desktop PC. Users are then able to interact with the applications running in the virtual desktop as if such applications were running on the desktop PC itself.

VDI deployments exhibit different resource consumption characteristics than typical server-based virtualization deployments. For example, unlike long-lived servers in server-based virtualization deployments, VDI deployments encounter simultaneous booting, suspending, resuming, and powering-off of virtual desktops consistent with the typical usage patterns of users accessing their desktop PCs. The higher density of virtual desktops in VDI deployments (in contrast to the relatively smaller number of virtual machines in server-based virtualization deployments) can result in time-oriented "I/O storms" (e.g., simultaneous anti-virus scans and updates, data backups and other scheduled activities) in which virtual desktops simultaneously compete for computing and storage resources within an organization's data center. For example, VDI deployments need to be configured to adequately addresses "boot storms," in which several hundreds of virtual desktops allocated to a single server need to be powered on at once. Such boot storms may occur, for example, each morning, when users arrive for work or when recovering from a data center or server failure.

Current VDI deployments often boot a large set of identical virtual desktops, for example, based upon a "gold master" image that is used to create a consistent base configuration for virtual desktops across an organization. Use of such a gold master image results in the storage of multiple boot images (e.g., allocated for each virtual desktop) that contain the same or similar data (originating from the gold master image) in an organization's storage area network (SAN). However, the occurrence of a boot storm (and other previously mentioned I/O storms) can unduly stress the network resources of a data center as servers continuously and repetitively request access to the SAN in order to read the respective boot images (or other data related to other types of I/O storms). This results in unacceptable delays suffered by users as they wait for their virtual desktops to boot (or receive data for other types of I/O storms).

SUMMARY

One or more embodiments of the present invention provide methods that reduce the need for a server to access a networked disk array during I/O intensive processes, such as a boot storm. Such methods may take advantage of high speed local persistent storage devices in the server, such as a solid state device drive, by maintaining a cache structure that stores data blocks that are repeatedly accessed by different virtual desktops during a boot storm or other I/O storm. For example, during a boot storm, each of the different virtual desktops running on the server may access its own unique boot image in the networked disk array. However, contents in each such unique boot image may be identical or similar to boot images of the other virtual desktops, thereby enabling such a cache structure to provide efficiencies by reducing network accesses.

One method, according to an embodiment, for obtaining data for a virtual machine in a server supporting a hypervisor for running virtual machines is performed by a cache filter component. The cache filter component may be running in a root virtual machine running in the server, for example. The cache filter component begins by first receiving a read request from the virtual machine intended for transmission to a virtual drive that is accessed through the root virtual machine. It then confirms that the read request corresponds to a specific content type (e.g., such as data of a boot image) in the virtual drive and identifies an entry in a cache index, wherein the entry includes (i) information that matches (a) an address offset in the read request and (b) an identity associated with the virtual machine, and (ii) a reference to data stored in a cache maintained in a local memory in the server. The cache filter component then circumvents (e.g., redirects I/O away from) a standard I/O stack of the root virtual machine used to access the virtual drive by requesting the data directly from the local memory by providing address information corresponding to the reference to a driver for the local memory. Once the cache filter component receives the data from the driver for the local memory, it can then transmit the data to the virtual machine in response to the read request.

DETAILED DESCRIPTION

Figure 1:
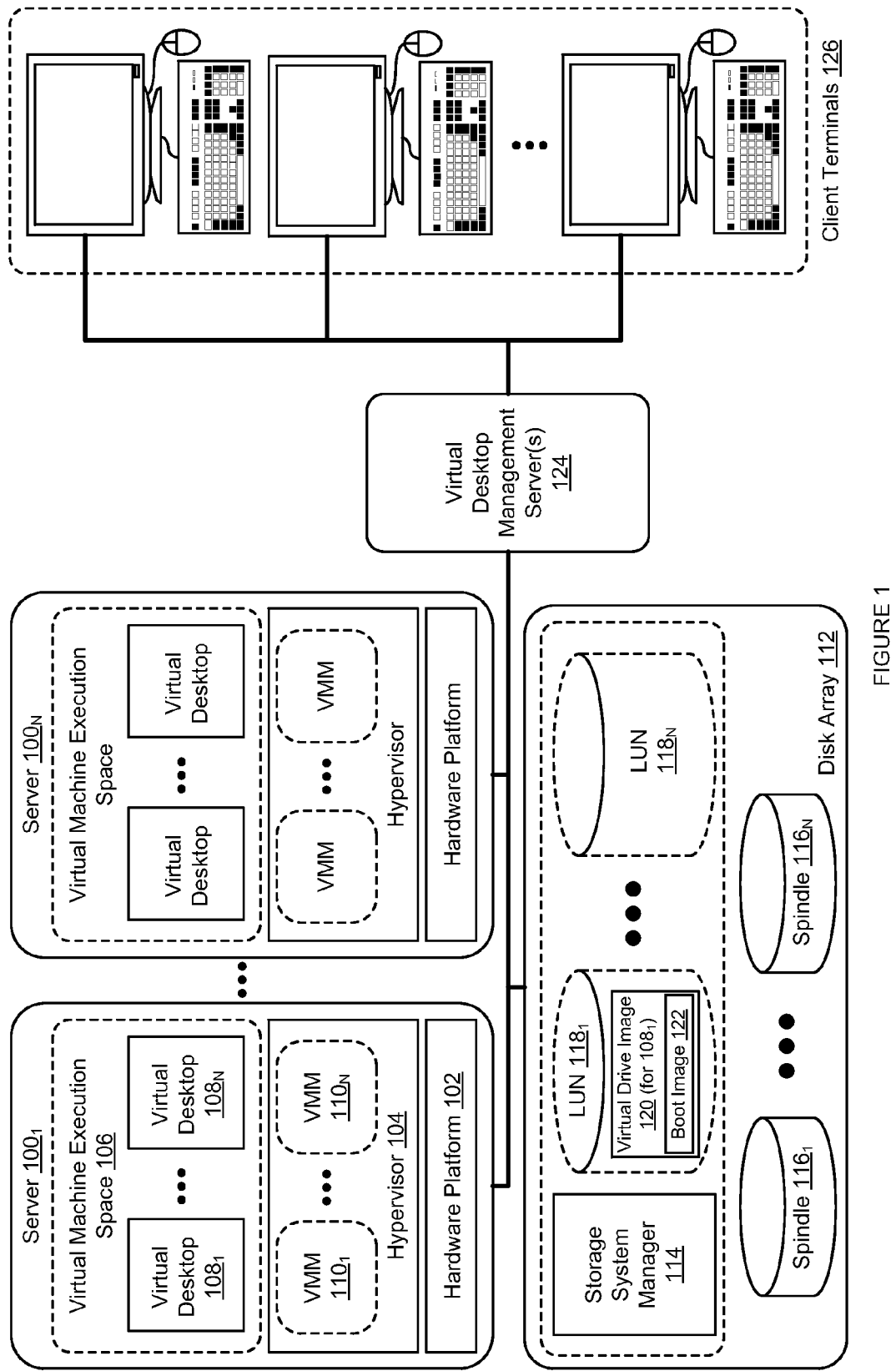
FIG. 1 depicts a block diagram of a data center architecture supporting a virtual desktop infrastructure (VDI).

FIG. 1 depicts a block diagram of a data center architecture supporting a virtual desktop infrastructure (VDI). The data center of FIG. 1 comprises a plurality of servers $100_1$-$100_N$ constructed on server class hardware platform, such as hardware platform 102. As further detailed below, hardware platform 102 may be, for example, an x86 architecture platform that includes a hard drive, network adapter, system memory, processor and other I/O devices such as a mouse, keyboard and the like.

A virtualization software layer, also referred to hereinafter as a hypervisor 104, is installed on top of hardware platform 102. Hypervisor 104 supports a virtual machine execution space 106 within which multiple virtual desktops (i.e., virtual machines running desktop operating systems and applications) may be concurrently instantiated and executed. As shown, virtual execution space 106 includes virtual desktops $108_1$-$108_N$. In one embodiment as further discussed in FIG. 2A, for each virtual desktop running on server $100_1$, hypervisor 104 provides a corresponding virtual machine monitor (VMM) $110_1$-$110_N$ that implements virtualization support such as emulated hardware to coordinate operations between hypervisor 104 and the virtual desktop.

Each of servers $100_1$-$100_N$ are further networked to an enterprise-level storage system such as disk array 112. Examples of disk array 112 may be a network attached storage (NAS) array, storage area network (SAN) array or any other similar disk array. Disk arrays such as SAN arrays typically provide block-level access to their stored data through SCSI-based protocols such as Fibre Channel and iSCSI. Disk array 112 comprises a storage system manager 114 that serves as the communication agent (to the outside world) for disk array 112 and implements a virtualization of the physical, typically disk drive-based storage units, referred to in FIG. 1, as spindles $116_1$-$116_N$, that reside in disk array 112. Storage system manager 114 abstracts away the complexities of targeting read and write operations to the physical addresses of the actual spindles by exposing to servers $100_1$-$100_N$ the ability to view the aggregate physical storage space provided by the disk drives as a contiguous logical storage space that is divided into set of virtual partitions known as LUNs (logical unit numbers) $118_1$-$118_N$. Storage system manager 114 provides servers $100_1$-$100_N$ the ability to transmit data transfer and control commands (e.g., read and write commands, etc.) to disk array 112 at the LUN "block" level, where a block is a particular contiguous region in a particular LUN. For example, a LUN block may be represented as <LUN ID, offset, length> and server $100_1$ may transmit to disk array 112 a read or write operation for block <LUN ID, offset, length> in the form of a SCSI operation. The embodiment of FIG. 1 depicts LUN $118_1$ maintained by disk array 112 that stores a virtual drive image 120 comprising data that corresponds to an emulated local hard drive for virtual desktop $108_1$ (e.g., in VMM $110_1$). Virtual drive image 120 further comprises a boot image 122 used to boot virtual desktop $108_1$. It should be recognized that, in exemplary embodiments, disk array 112 stores a virtual drive image similar to virtual drive image 120 for each of the other virtual desktops $108_2$-$108_N$ in one of LUNs $118_1$-$118_N$ and that each such virtual drive image comprises its own boot image, similar to boot image 122, that contains the same (or substantially similar) data as boot image 122 (e.g., in order to maintain and manage consistent core boot images across the virtual desktops of an organization).

A virtual desktop management server (or servers) 124 placed between servers $100_1$-$100_N$ and user terminals 126 manages the provisioning of virtual desktops on servers $100_1$-$100_N$ to user terminals 126 and provides additional administrative and management capabilities such as boot image (e.g., updates, patches, etc.) management and desktop security policies. User terminals 126 may execute a "thin client" application that interacts with virtual desktop management server 124 to connect to a user's virtual desktop and render the virtual desktop's graphical user interface. Alternatively, a user terminal may access a virtual desktop through web browser access or through other similar means. It should be recognized that various modifications and changes may be made to the data center embodiment of FIG. 1 consistent with the teachings set forth herein. For example, servers $100_1$-$100_N$ and may be connected through various different known topologies and technologies (e.g., switches, etc.) to multiple storage systems similar to disk array 112. One alternative embodiment may implement virtual desktop management server 124 as a virtual machine running on one of servers $100_1$-$100_N$. A further alternative embodiment may not necessarily utilize a separate virtual desktop management server. One example of virtual desktop management server 124 that may be used in embodiments is the VMware Virtual Desktop Manager product, which is commercially available from VMware, Inc. of Palo Alto, Calif.

Figure 2A:
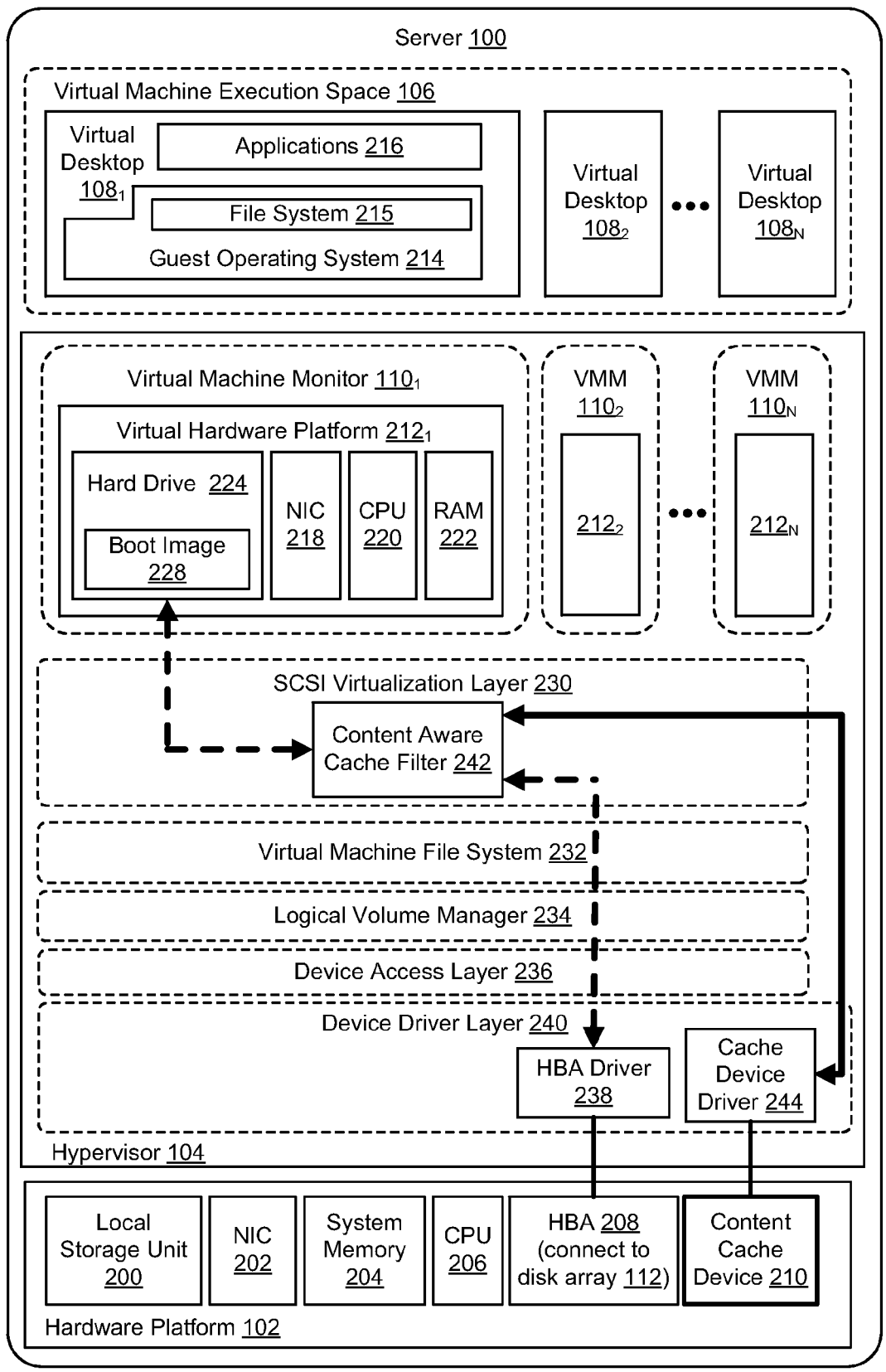
FIG. 2A depicts a block diagram of a server utilizing a first virtualization architecture in a data center supporting VDI.

FIG. 2A depicts a block diagram of a server utilizing a first virtualization architecture in a data center supporting VDI. As previously discussed in the context of FIG. 1, hardware platform 102 of server 100 may include a local storage unit 200, such as a hard drive, network adapter (NIC 202), system memory 204, processor (CPU 206) and other I/O devices such as, for example, a mouse and keyboard (not shown in FIG. 2A). Hardware platform 102 further includes a host bus adapter (HBA 208) that networks server 100 to disk array 112 as well as a "content cache device" 210. As used herein, a "content cache device" refers to a solid state drive (SSD), also referred to as an enterprise flash drive (EFD), standard RAM memory, local hard drives, disk array LUNs, or any other persistent or non-persistent memory or secondary storage, local or remote, that may be used as a "content aware" cache as further described herein. In one embodiment, content cache device 210 is a local SSD, separate from local storage unit 200 or system memory 204, that provides server 100 with an additional high speed persistent local storage unit that can be leveraged, for example, to increase the performance of less commonly occurring, but I/O intensive, processes without competing for additional system memory 204 and local storage unit 200 resources with other more commonly occurring routines that generally support the running of virtual desktops on server 100. One such commonly occurring, but I/O intensive process is the boot-up process for virtual desktops which results in a "boot storm" as previously discussed when multiple virtual desktops are simultaneously attempting to boot.

Hypervisor 104, installed on top of hardware platform 102, supports virtual machine execution space 106 within which multiple virtual desktops $108_1$-$108_N$ may be concurrently instantiated and executed. For each of virtual desktops $108_1$-$108_N$, hypervisor 104 implements a corresponding virtual machine monitor (VMM) $110_1$-$110_N$ that includes a virtual hardware platform (i.e., virtual hardware platforms $212_1$-$212_N$) of emulated hardware, such as virtual NIC 218, virtual CPU 220, guest physical RAM 222 and local virtual hard drive 224 for virtual desktop $108_1$. In one embodiment, virtual hardware platform $212_1$ may function as an equivalent of a standard x86 hardware architecture such that any x86 supported desktop operating system, e.g., Microsoft Windows®, Linux®, Solaris® x86, NetWare, FreeBSD, etc., may be installed as guest operating system 214 (which includes a file system 215) to execute any supported application in application layer 216. As further depicted, local virtual hard drive 224 includes a boot image 228 that guest operating system 214 accesses upon a boot process. As further detailed below, during a boot process, for example, although guest operating system 214 appears to be transmitting read commands to local hard drive 224 to read boot image 228, the boot image read requests are typically passed by virtual local hard drive 224 through an I/O stack in hypervisor 104 to an HBA device driver 238 in order to read the actual data blocks residing in boot image 122 of virtual drive image 120 residing in LUN $118_1$ of networked disk array 112, which corresponds to local virtual hard drive 224.

Generally, file system operations (e.g., file read or file write commands) issued by guest operating system 214 appear, from the perspective of guest operating system 214, to be routed to local virtual hard drive 224 but are actually translated and passed through various layers in the I/O stack of hypervisor 104, as depicted, for example, in FIG. 2A. Assuming that local virtual hard drive 224 supports the SCSI standard, a SCSI virtualization layer 230 in hypervisor 104 receives a SCSI command from local virtual hard drive 224 in VMM $110_1$ and translates the command into file system operations that are understood by a virtual machine file system (VMFS) 232. One example of a VMFS 232 is the VMware VMFS which is commercially available from VMware, Inc., although it should be recognized that other known file systems such as NFS and the like may be implemented in various embodiments. VMFS 232 generally manages the creation, use, and deletion of files stored on the disk array 112 through LUN abstractions. SCSI virtualization layer 230 then issues these VMFS file system operations to the VMFS 232 which, in turn, converts the VMFS file system operations to LUN block operations and transmits the LUN block operations to a logical volume manager 234. Logical volume manager 234 issues raw SCSI operations to a device access layer 236 based on the LUN block operations. Device access layer 236 identifies networked disk array 112 as the hardware storage resource corresponding to the received raw SCSI operations and then applies command queuing and scheduling policies to the raw SCSI operations. HBA device driver 238 in device driver layer 240 communicates with HBA 208 and transmits the raw SCSI operations from the device access layer 236 to HBA 208 to be transmitted to disk array 112. Once storage system manager 114 of disk array 112 (depicted in FIG. 1) receives the raw SCSI operations (i.e., LUN block level operations), it resolves the raw SCSI operations into the appropriate locations within the spindles of disk array 112 that must be accessed, accesses the data at the appropriate locations and performs requested operation (i.e., read or write) and transmits a response back to guest operating system 214 in virtual desktop $108_1$ (e.g., through HBA 208 and back up the I/O stack in hypervisor 104).

FIG. 2A further depicts a "content aware" cache filter 242 in SCSI virtualization layer 230. In one embodiment, content aware cache filter 242 is configured to engage during a boot storm (i.e., the content aware cache filter is "aware" of read operations corresponding to the booting process) to reduce the repetition of network accesses by server 100 to read the data blocks of boot images of virtual drive images (e.g., such as boot image 122 of virtual drive image 120) in LUNs $118_1$-$118_N$ of disk array 112. For example, when virtual desktops $108_1$-$108_N$ access the local boot images (e.g., boot image 228) in their local virtual hard drives (e.g., local virtual hard drive 224) during a boot storm, the actual data blocks of the boot images in their corresponding virtual drive images that are stored in LUNs $118_1$-$118_N$ of disk array 112 often contain the same data due to the similarity of boot images across virtual desktops that is imposed, for example, by an organization's desktop management policy. In the embodiment of FIG. 2A, content aware cache filter 242 intercepts SCSI read commands from VMMs $110_1$-$110_N$ (corresponding to virtual desktops $108_1$-$108_N$) and filters them to determine which read commands correspond to requests for data blocks in a virtual desktop's respective boot image 228, residing on its local virtual hard drive 224 (but which are actually stored in boot image 122 of virtual drive image 120, for example, for virtual desktop $108_1$). For example, content aware cache filter 242 may recognize offsets in read operations that correspond to data blocks in boot image 228. Upon intercepting such filtered read commands, content aware cache filter 242 circumvents (e.g., redirects I/O away from) the I/O stack layers of hypervisor 104 and directly communicates with content cache device 210 (via cache device driver 244) to determine whether the requested data blocks are present in a cache structure locally stored in content cache device 210. In this manner, content aware cache filter 242 is agnostic with respect to (i.e., not dependent upon) any implementation of a file system layer (e.g., VMFS, NFS or any other known file system protocols, etc.) situated below content aware cache filter 242 in the I/O stack of hypervisor 104 and any technical requirements or peculiarities related thereto.

It should further be recognized that the various terms, layers and categorizations used to describe the virtualization components in FIG. 2A may be referred to differently without departing from their functionality or the spirit or scope of the invention. For example, although a SCSI virtualization layer 230 is described in the context of FIG. 2A, it should be recognized that any other hardware interface standards may be utilized in alternative embodiments for an analogous I/O virtualization layer, including IDE, ATA, ATAPI, and any other I/O interfaces for reading and writing blocks of data. Similarly, virtual hardware platforms $212_1$-$212_N$ may also be considered to be separate from VMMs $110_1$-$110_N$, and VMMs $110_1$-$110_N$ may be considered to be separate from hypervisor 104 or part of corresponding virtual desktops $108_1$-$108_N$. One example of hypervisor 104 that may be used is included as a component of VMware's ESX™ product, which is commercially available from VMware, Inc. It should further be recognized that other virtualized computer systems consistent with the teachings herein are contemplated, such as hosted virtual machine systems, where the hypervisor is implemented in conjunction with a host operating system. It should further be recognized that although FIG. 2A refers to the booting process and a boot image 228, in alternative embodiments, content aware cache filter 242 may be configured to engage when virtual desktops $108_1$-$108_N$ access other types of data in their local virtual hard drives (e.g., local virtual hard drive 224), such as virus scans and updates and other types of data, wherein the blocks of data stored in the corresponding virtual drive images in LUNs $118_1$-$118_N$ of disk array 112 often contain the same data due to the similar use of such data across virtual desktops.

Figure 2B:
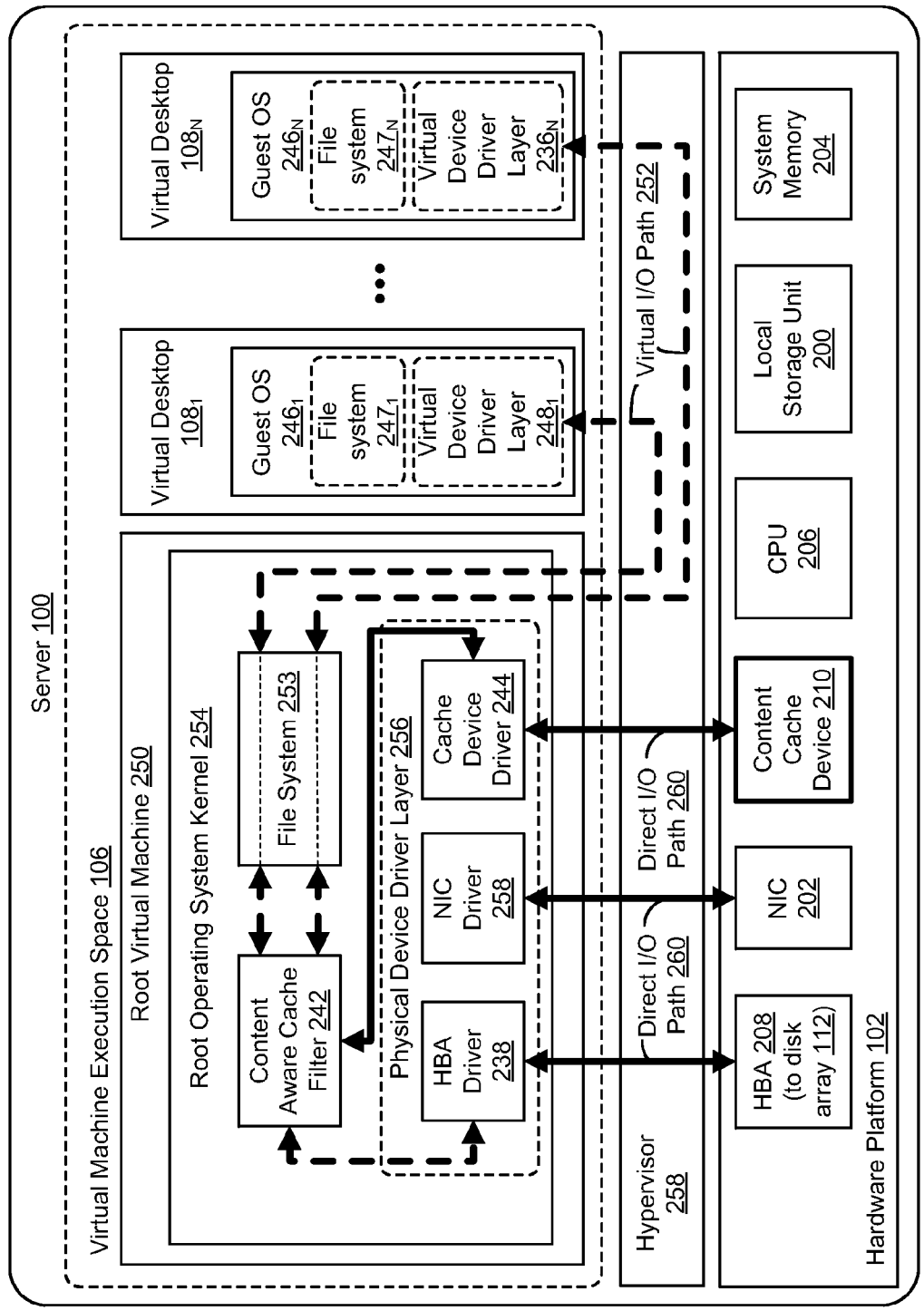
FIG. 2B depicts a block diagram of a server utilizing a second virtualization architecture in a data center supporting VDI.

FIG. 2B depicts a block diagram of a server utilizing a second virtualization architecture in a data center supporting VDI. Similar to FIG. 2A, server 100 includes a hardware platform 102 comprising local storage unit 200, NIC 202, system memory 204, CPU 206, HBA 208, content cache device 210 and other I/O devices. A hypervisor 258 is installed on top of hardware platform 102 and supports virtual machine execution space 106 within which multiple virtual desktops $108_1$-$108_N$ may be concurrently instantiated and executed. Each of virtual desktops $108_1$-$108_N$, supports a guest operating system $246_1$-$246_N$ such as Microsoft Windows®, Linux®, Solaris® x86, NetWare, FreeBSD or any other desktop operating system, which includes, for example, a corresponding file system $247_1$-$247_N$. Unlike the virtualization architecture of FIG. 2A, each guest operating system $246_1$-$246_N$ comprises a virtual device driver layer $248_1$-$248_N$ that emulates communication with hardware platform 102 but actually corresponds with a root virtual machine 250 (also sometimes referred to as a "domain 0" virtual machine), via virtual I/O paths 252 through hypervisor 258, in order to perform I/O.

Root virtual machine 250 has unique and special privileges to communicate with hardware platform 102 on behalf of virtual desktops $108_1$-$108_N$. Root virtual machine 250 comprises an operating system kernel 254 that has a file system 253 that maps virtual disk devices accessible in virtual desktops $108_1$-$108_N$ (e.g., accessed as file systems $247_1$-$247_N$) to backing files on a storage volume, such as disk array 112 and a physical device driver layer 256 to directly correspond with the devices in hardware platform 102 (e.g., direct I/O paths 260). For example, physical device driver layer 256 comprises HBA device driver 238 that communicates with HBA 208 to access data stored in disk array 112 and a NIC driver 258 that interacts with NIC 202 for perform network communications. Additionally, physical device driver layer 256 further comprises a cache device driver 244 that, as in FIG. 2A, communicates with content cache device 210.

Operating system kernel 254 further includes content aware cache filter 242, which receives I/O requests through hypervisor 258 from virtual desktops $108_1$-$108_N$ (e.g., through file system 253). Similar to the description of the content aware cache filter in FIG. 2A, in one embodiment, content aware cache filter 242 is configured to engage during a boot storm to reduce the repetition of network accesses by server 100 to read the data blocks of boot images of different virtual drive images in LUNs $118_1$-$118_N$ of disk array 112 that contain the same data. Content aware cache filter 242 intercepts read commands routed from virtual desktops $108_1$-$108_N$ to root virtual machine 250 and filters them to determine which read commands correspond to requests for data blocks in a virtual desktop's respective boot image (or other specified type of content). Upon intercepting such filtered read commands, content aware cache filter 242 directly communicates with content cache device 210 (via cache device driver 244) to determine whether the requested data blocks are present in a cache structure locally stored in content cache device 210.

Figure 3:
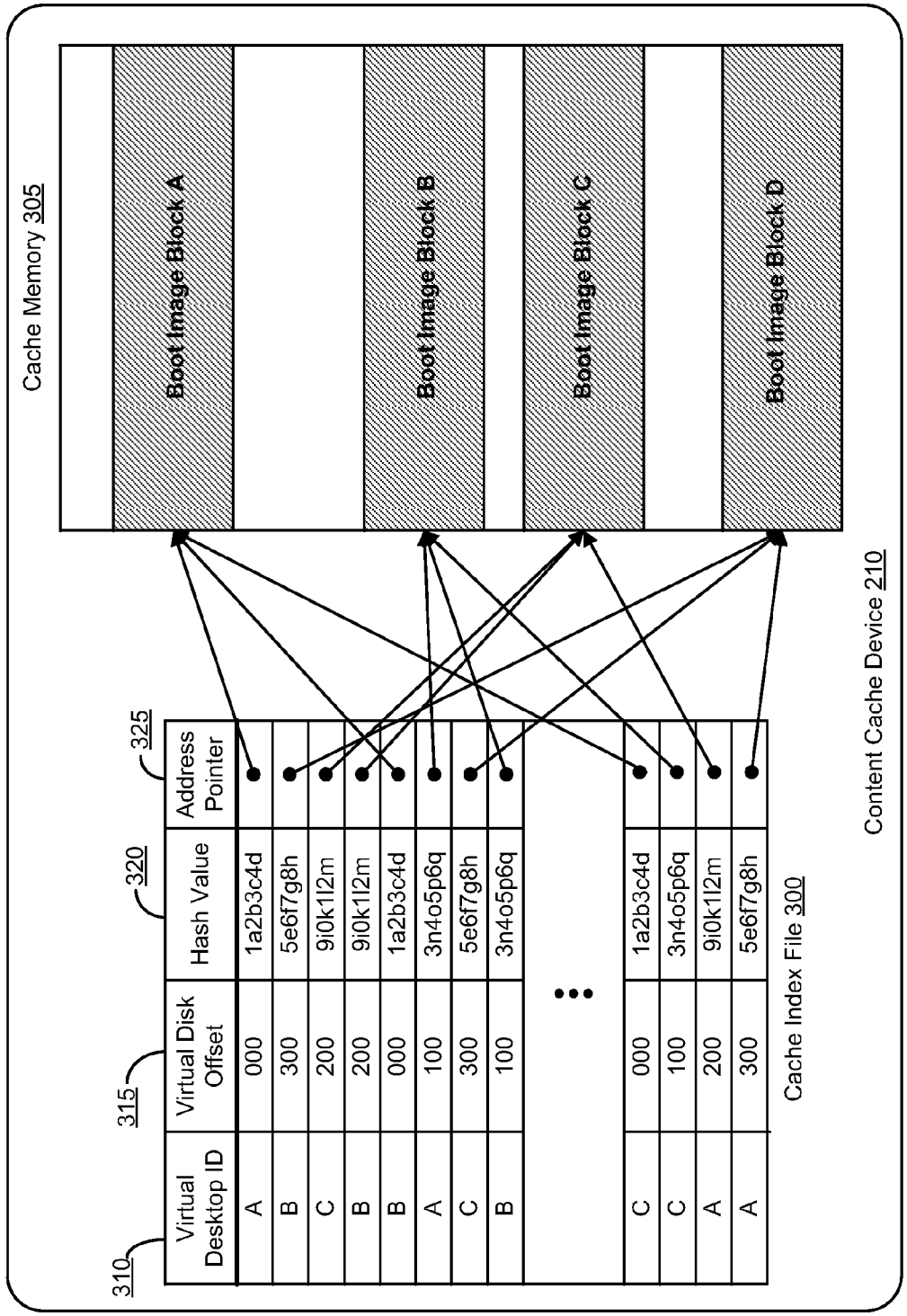
FIG. 3 depicts a block diagram of a content aware cache structure in a server supporting virtual desktops.

FIG. 3 depicts a block diagram of a content aware cache structure in a server supporting virtual desktops. In the embodiment of FIG. 3, content cache device 210 stores a cache index file 300 and cache memory 305. Entries in cache index file 300 are searched by content aware cache filter 242 to determine whether read requests from a virtual desktop during a boot-up process (or other specified type of content) can be serviced by data stored in cache memory 305 rather than through network communications with disk array 112. Each entry of cache index file 300 comprises a virtual desktop ID field 310, virtual disk offset field 315, hash value field 320 and address pointer field 325.

An entry's virtual desktop ID field 310 enables content aware cache filter 242 to determine whether the entry pertains to a virtual desktop that has issued a boot related read command (or read command for any other specified content type, in other embodiments) that has been intercepted by content aware cache filter 242. If the identification of the virtual desktop issuing the read command matches the virtual desktop identification field 310 of an entry, then the entry's virtual desktop offset field 315 enables content aware cache filter 242 to determine whether the entry pertains to the actual block (or blocks) requested in the read command. Hash value field 320 of an entry contains a hash value of the data block (or blocks) referenced by the entry's address pointer field 325 that is stored in cache memory 305. In one embodiment, the hash value is computed using SHA1 or SHA256 algorithms (although any other known hash algorithms or techniques may be used consistent with the teachings herein). Hash value field 320 enables content aware cache filter 242 to determine whether a data block that has been currently read from disk array 112 during, for example, a boot process for one virtual desktop has already been stored in cache memory 305 (e.g., during a previous boot process for a different virtual desktop). By computing the hash value for such a currently read data block, content aware cache filter 242 can add a new entry into cache index file 300 that points to a pre-existing data block in cache memory 305 if it finds a match of the hash value in a hash value field 230 of one of the entries in cache index file 300 (see, e.g., multiple address pointers of multiple entries point to common boot image data blocks A, B, C, D in cache memory 305 as depicted in FIG. 3).

It should be recognized that many alternative or additional cache structures and techniques may be implemented in embodiments to increase performance of the cache structure, consistent with the teachings herein. For example, rather than utilizing a list of entries as depicted in FIG. 3, alternative embodiments may utilize various known data structures and algorithms to combine repeated fields values, increase efficiencies when searching the entries or when adding or removing entries. One alternative embodiment, for example, may utilize a "per-virtual desktop" index file comprising entries with fields such as virtual desktop ID, virtual disk offsets and hash values (or address pointers) in order to process received SCSI read commands from virtual desktops, and a separate "per host" hash table comprising hash values and corresponding address pointers to cached data (e.g., to access actual cached data and to process new un-cached data blocks received from disk array 112). One alternative embodiment may further include a frequency access field for each entry to assist content aware cache filter 242 in determining entries eligible for removal (i.e., least accessed, etc.) in the event a new entry should be added and cache index file 300 is full. Similarly, another alternative embodiment may further include a generation number field for each entry indicating a version or generation number for the entry's corresponding data block (or blocks) stored in cache memory 305. For example, if an organization's administrator updates boot image 122 (e.g., applying a patch, upgrade, etc.) in disk array 112, the generation number associated with boot image 122 may be increased such that content aware cache filter 242 can later recognize that it needs to revalidate the corresponding entries in cache index file 300 and the corresponding data blocks in cache memory 305.

Figure 4:
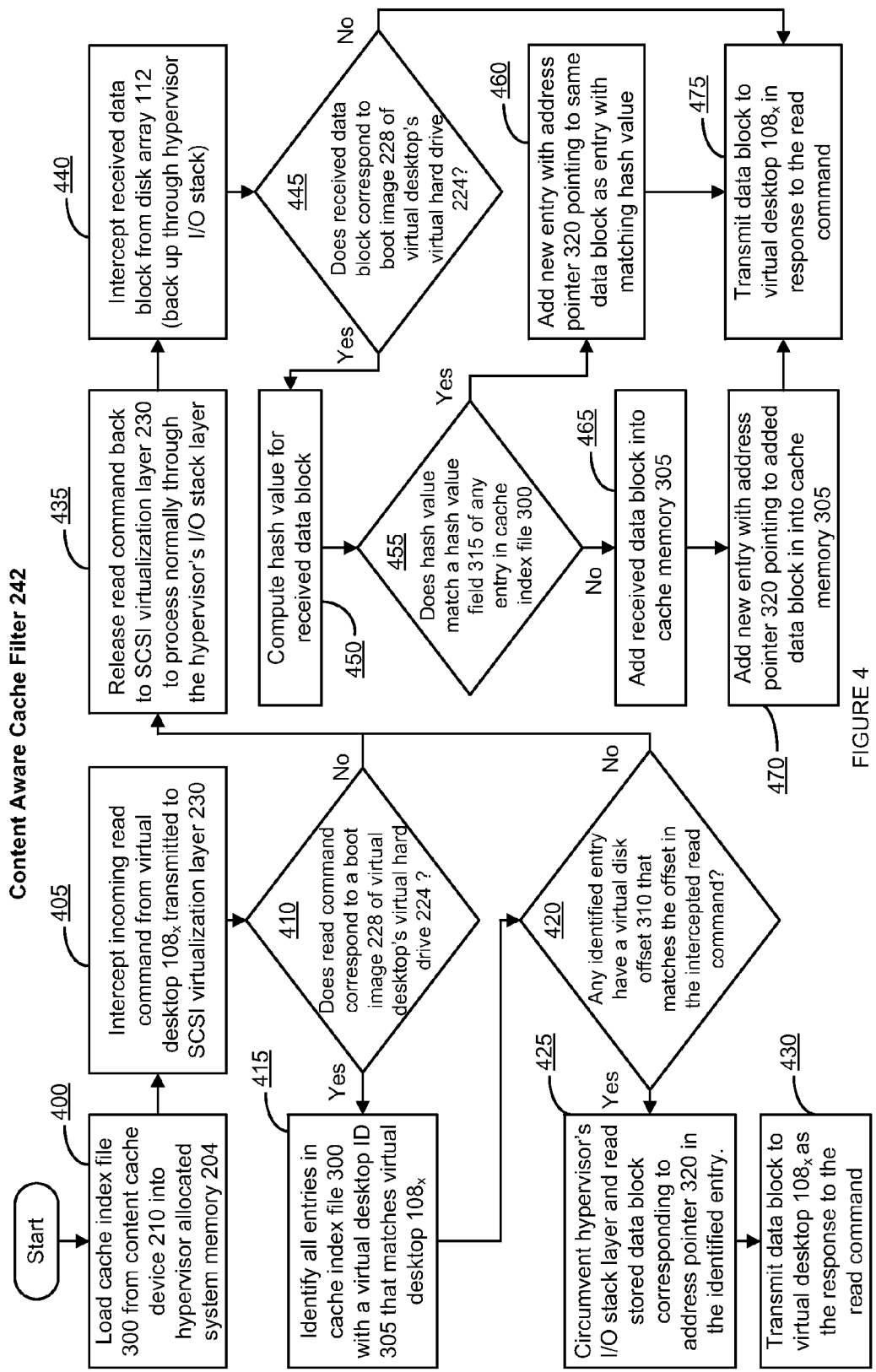
FIG. 4 depicts a flow diagram for booting a virtual desktop utilizing a content aware cache structure.

FIG. 4 depicts a flow diagram for booting a virtual desktop utilizing a content aware cache structure. However, it should be recognized that the steps of FIG. 4 may similarly be utilized for processes for other specified content other than boot data, including for example, anti-virus checks and updates, data back-up processes and other similar I/O storm related content. In step 400, content aware cache filter 242 loads cache index file 300 from content cache device 210 into system memory 204 (e.g., allocated to hypervisor 104). In step 405, as previously discussed, content aware cache filter 242 intercepts an incoming read command from virtual desktop $108_x$ that, for example, has been transmitted to SCSI virtualization layer 230 of the virtualization architecture of FIG. 2A (or alternatively, has been received by root virtual machine 250 in the virtualization architecture of FIG. 2B). If, in step 410, the intercepted read command corresponds to reading boot image 228 in local virtual hard drive 224 of virtual desktop $108_x$ (i.e., the read command is a request to read a data block to boot up virtual desktop $108_x$), then in step 415, content aware cache filter 242 identifies all entries in cache index file 300 with a virtual desktop ID 305 that matches virtual desktop $108_x$. In step 420, if any identified entry in step 415 has a virtual disk offset 315 that matches the offset in the intercepted read command, then in step 425, content aware cache filter 242 circumvents the standard I/O stack of hypervisor 104 (e.g., as depicted in FIG. 2A) and reads the stored data block (or blocks) in cache memory 305 corresponding to address pointer 325 in such an identified entry in cache index file 300. In step 430, content aware cache filter 242 then transmits the data block read from cache memory 305 to virtual desktop 108$_x$ in the response to the read command intercepted in step 405.

If, however, in step 420, no entry in cache index file 300 matches the offset of the read command, then in step 435, content aware cache filter 242 releases the intercepted read command back to SCSI virtualization layer 230 to process normally through the I/O stack of hypervisor 104, as depicted in FIG. 2A (or releases the read command to the physical device layer 256 as depicted in FIG. 2B). For example, in the embodiment of FIG. 2A, if the read command corresponds to reading a data block in boot image 228 of virtual local hard drive 224 of virtual desktop 108$_x$ in step 410, then the read command is ultimately passed through the I/O stack of hypervisor 104 to HBA driver 238 in order to read the data block (or blocks) from boot image 122 of virtual drive image 120 in LUN 118$_1$ in networked disk array 112. Upon receiving the read data block back from disk array 112 at SCSI virtualization layer (i.e., back up through the I/O stack of hypervisor 104), content aware cache filter 242 intercepts the received data block (or blocks) in step 440 and determines, in step 445, whether the received data block (or blocks) corresponds to a read command for boot image 228 of local virtual hard drive 224 (i.e., the data block has been read from boot image 122 in disk array 112).

If the received data block (or blocks) does correspond to a read command for boot image 228, then in step 450, content aware cache filter 242 computes a hash value on the received data block (or blocks). In step 455, content aware cache filter 242 determines whether the computed hash value matches a hash value field 320 in any entry of cache index file 300. If there is a matching entry, content aware cache filter 242 adds a new entry into cache index file 300 with an address pointer 325 that points to same data block in cache memory 305 as address pointer 325 of the matched entry. The new entry's hash value field 320 contains the computed hash value, its virtual disk offset field 315 contains the offset identified in step 420, and its virtual disk ID field 310 contains virtual desktop 108$_x$. In step 475, content aware cache filter 242 completes its filtering process by transmitting the received data block to virtual desktop 108$_x$ in response to the read command. If, however, there is no matching entry in step 455, then the data block has not been previously stored in cache memory 305 and content aware cache filter 242 adds the received data block into cache memory 305 in step 465. In step 470, adds a corresponding new entry into cache index file 300 with address pointer 325 pointing to the added data block in cache memory 305 before completing the filtering process in step 475.

It should be recognized that various modifications and changes may be made to the specific embodiments described herein without departing from the broader spirit and scope of the invention as set forth in the appended claims. For example, while the foregoing discussions and embodiments have detailed content aware cache filters and cache structures that focus on boot-up processes and boot images, it should be recognized that the caching techniques herein may also be used to reduce I/O access to networked resources, such as disk array 112, for any other purpose. For example, alternative embodiments may use a content aware cache filter as discussed herein to provide anti-virus scans and updates or data backup rather than data blocks relating to boot images. It should be recognized that embodiments may implement the "content aware" cache structures described herein in a variety of ways, such that the cache structure is accessed for specific purposes or specific types of content (e.g., booting, anti-virus, data backup, etc.). In one such embodiment, the content aware cache filter checks the offsets of intercepted read commands to determine whether the offsets relate to data of a specified content type. Similarly, it should be recognized that a content cache device as described herein may utilize any storage hardware technology of the service, such as SSDs, standard RAM memory, local hard drives, disk array LUNs, and any other persistent or non-persistent, local or remote, memory or storage. In an embodiment, a combination of persistent (e.g., SSD, local hard drive, disk array LUN, etc.) and non-persistent memories (RAM memory, etc.) may be combined to provide different functions of the cache structure as discussed herein. For example, in one such embodiment, an offline process computes and stores a "digest" file for each virtual drive image (such as virtual drive 120) in disk array 112. Such a digest file comprises hash values for the blocks in the virtual drive image (and other metadata, bitmaps, etc.). When a virtual desktop is powered on, the digest file corresponding to the virtual desktop may be loaded into RAM memory and the hash values therein may serve as a "per virtual desktop" index file for the virtual desktop, which assists in referencing hash values in a separate "per host" hash table that includes address pointers to actual cached data (e.g., in an SSD, local RAM memory or other local memory). Further, it should be recognized that the I/O stacks of a hypervisor as depicted in FIGS. 2A and 2B are merely exemplary and that alternative embodiments may utilize different virtualization architectures (e.g., full virtualization architectures, paravirtualization architectures, etc.). In such alternative virtualization architectures, it should be recognized that the "content aware" filtering techniques described herein would be inserted into an I/O stack of the hypervisor (or elsewhere in such virtualization architectures) at an appropriate point where the filtering techniques are able to read and write at offsets in virtual disks. Additionally, while FIGS. 1 and 2A and the discussion herein have depicted and described separate boot images (e.g., boot image 122) for each virtual desktop, it should be recognized that, in alternative embodiments, such boot images may further reference data blocks residing a separate gold master image residing in disk array 112 (e.g., rather than replicating such common data blocks for boot image in each separate virtual drive image stored disk array 112). Furthermore, it should be recognized that while the embodiments herein have focused upon processing read operations, for example, during a boot up process, similar cache structure techniques may be used for write operations.

The various embodiments described herein may employ various computer-implemented operations involving data stored in computer systems. For example, these operations may require physical manipulation of physical quantities usually, though not necessarily, these quantities may take the form of electrical or magnetic signals where they, or representations of them, are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs) CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

I claim:

1. A method for obtaining data for a virtual machine in a server supporting a hypervisor for running virtual machines, the method comprising:
   receiving a read request from the virtual machine intended for transmission to a virtual drive that is accessed through a root virtual machine running in the server;
   confirming that the read request corresponds to a specific content type in the virtual drive;
   identifying an entry in a cache index, wherein the entry includes (i) information that matches (a) an address offset in the read request and (b) an identity associated with the virtual machine, and (ii) a reference to data stored in a cache maintained in a local memory in the server;
   circumventing a standard I/O stack of the root virtual machine used to access the virtual drive by requesting the data directly from the local memory by providing address information corresponding to the reference to a driver for the local memory;
   receiving the data from the driver for the local memory; and
   transmitting the data to the virtual machine in response to the read request.

2. The method of claim 1, wherein the specific content type relates to data in a boot image in the virtual drive.

3. The method of claim 2, wherein the server is networked to a disk array that stores an actual boot image comprising data blocks of the boot image in the virtual drive.

4. The method of claim 1, wherein the local memory is a solid state drive in the server.

5. The method of claim 1, wherein the reference is a hash value corresponding to an entry in a hash table including the address information, which is used to access the data stored in the cache.

6. The method of claim 5, wherein the reference is included in at least one other entry in the cache index that includes an identity associated with another virtual machine.

7. The method of claim 1, wherein the steps are performed by a cache filter component running in the root virtual machine.

8. A non-transitory, computer-readable storage medium including instructions that, when executed by a computer processor of a server supporting a hypervisor for running virtual machines, causes the computer processor obtain data for a virtual machine by performing the steps of:
   receiving a read request from the virtual machine intended for transmission to a virtual drive that is accessed through a root virtual machine running in the server;
   confirming that the read request corresponds to a specific content type in the virtual drive;
   identifying an entry in a cache index, wherein the entry includes (i) information that matches (a) an address offset in the read request and (b) an identity associated with the virtual machine, and (ii) a reference to data stored in a cache maintained in a local memory in the server;
   circumventing a standard I/O stack of the root virtual machine used to access the virtual drive by requesting the data directly from the local memory by providing address information corresponding to the reference to a driver for the local memory;
   receiving the data from the driver for the local memory; and
   transmitting the data to the virtual machine in response to the read request.

9. The non-transitory, computer-readable storage medium of claim 8, wherein the specific content type relates to data in a boot image in the virtual drive.

10. The non-transitory, computer-readable storage medium of claim 9, wherein the server is networked to a disk array that stores an actual boot image comprising data blocks of the boot image in the virtual drive.

11. The non-transitory, computer-readable storage medium of claim 8, wherein the local memory is a solid state drive in the server.

12. The non-transitory, computer-readable storage medium of claim 8, wherein the reference is a hash value corresponding to an entry in a hash table including the address information, which is used to access the data stored in the cache.

13. The non-transitory, computer-readable storage medium of claim 12, wherein the reference is included in at least one other entry in the cache index that includes an identity associated with another virtual machine.

14. The non-transitory, computer-readable storage medium of claim 8, wherein the steps are performed by a cache filter component running in the root virtual machine.

15. A server supporting a hypervisor for running virtual machines and configured to obtain data for a virtual machine running in the server, the server comprising a processor configured to perform the steps of:
- receiving a read request from the virtual machine intended for transmission to a virtual drive that is accessed through a root virtual machine running in the server;
- confirming that the read request corresponds to a specific content type in the virtual drive;
- identifying an entry in a cache index, wherein the entry includes (i) information that matches (a) an address offset in the read request and (b) an identity associated with the virtual machine, and (ii) a reference to data stored in a cache maintained in a local memory in the server;
- circumventing a standard I/O stack of the root virtual machine used to access the virtual drive by requesting the data directly from the local memory by providing address information corresponding to the reference to a driver for the local memory;
- receiving the data from the driver for the local memory; and
- transmitting the data to the virtual machine in response to the read request.

16. The server of claim 15, wherein the specific content type relates to data in a boot image in the virtual drive.

17. The server of claim 16, wherein the server is networked to a disk array that stores an actual boot image comprising data blocks of the boot image in the virtual drive.

18. The server of claim 15, wherein the local memory is a solid state drive in the server.

19. The server of claim 15, wherein the reference is a hash value corresponding to an entry in a hash table including the address information, which is used to access the data stored in the cache.

20. The server of claim 15, wherein the reference is included in at least one other entry in the cache index that includes an identity associated with another virtual machine.

* * * * *